April 12, 1966  J. A. LEVENDUSKY ETAL  3,245,543
CLARIFIER APPARATUS

Filed Nov. 7, 1960  2 Sheets-Sheet 1

INVENTORS:
Joseph A. Levendusky
Hazelton H. Avery
By Byron, Hume, Gron & Clement
Attorneys.

INVENTORS:
Joseph A. Levendusky
Hazelton H. Avery
By Byron, Hume, Groen & Clement
Attorneys.

United States Patent Office 3,245,543
Patented Apr. 12, 1966

3,245,543
CLARIFIER APPARATUS
Joseph A. Levendusky, Bayonne, N.J., and Hazelton H. Avery, New Rochelle, N.Y., assignors to Union Tank Car Company, Chicago, Ill., a corporation of New Jersey
Filed Nov. 7, 1960, Ser. No. 67,859
8 Claims. (Cl. 210—521)

The present invention relates to an apparatus for clarifying liquids, and more particularly, to an apparatus for purifying or clarifying liquids containing solids, contaminants, and the like.

It is an object of the present invention to provide a new and improved clarifier apparatus for continuously removing solids and the like from liquids.

It is a further object of the present invention to provide a clarifier apparatus in which liquids to be purified undergo controlled flocculation immediately upon entry into the apparatus, thereby producing heavy agglomerated particles adapted to be readily settled out of solution.

It is another object, in accordance with the previous object, to cause the liquid to be purified to become slightly turbulent immediately after its entry into the apparatus, thereby to promote flocculation.

It is another object of the present invention to provide a clarifier apparatus wherein relatively heavy solids or particles are removed from a liquid immediately after its entry in the clarifier apparatus, thereby facilitating purification of the liquid during successive clarification stages in the apparatus.

It is a further object of this invention to provide downstream of a primary sedimentation area in a clarifier apparatus a free-fall separation zone that facilitates faster and more complete clarification of a fluid.

It is yet a further object of the present invention to provide adjacent the inlet of a clarifier apparatus a primary sedimentation area for removing heavy agglomerated particles from a liquid and, further, a secondary sedimentation area for removing medium and light weight particles from the liquid, the latter particles passing into the secondary area directly through a free-fall separation zone and indirectly through a final separating zone.

It is another object of the present invention to provide a clarifier apparatus wherein the settled particles or solids are gently agitated prior to their removal from the clarifier apparatus, thereby to enable maximum thickening of the accumulated particles and maximum liberation of liquid entrapped in the particles.

The above and other objects are realized in accordance with the present invention by providing a new and improved clarifier apparatus for purifying liquids containing solids or contaminants. Briefly, the liquid to be purified; i.e. a liquid containing solids and the like, is fed into the clarifier apparatus and both purified liquids and thickened solids and/or particles are produced by and discharged from the apparatus. Immediately after entry of the liquid into the clarifier apparatus a large percentage of heavy solids or particles is removed in a primary sedimentation area. The heavy particles are collected and are gently agitated to cause liberation of entrapped liquids and thickening of the solids prior to removal from the clarifier apparatus. The partially purified liquid then flows into a free-fall separation zone wherein a large portion of the remaining solids move under gravity directly into a secondary sedimentation area. Similar to the action in the primary sedimentation area, the accumulated solids in the secondary area are gently agitated to liberate entrapped liquid and to effect its thickening prior to removal from the clarifier apparatus. The partially purified liquid passes from the free-fall separation zone into a final separation zone and then is withdrawn from the clarifier apparatus.

In the final separation zone, the relatively small solids are removed from the liquid and are returned to the free-fall separation zone and pass under gravity action into the secondary sedimentation area.

The invention, as to its organization, taken with further objects and advantages thereof, will best be understood by reference to the following description taken in connection with the accompanying drawings, in which.

Figure 1:
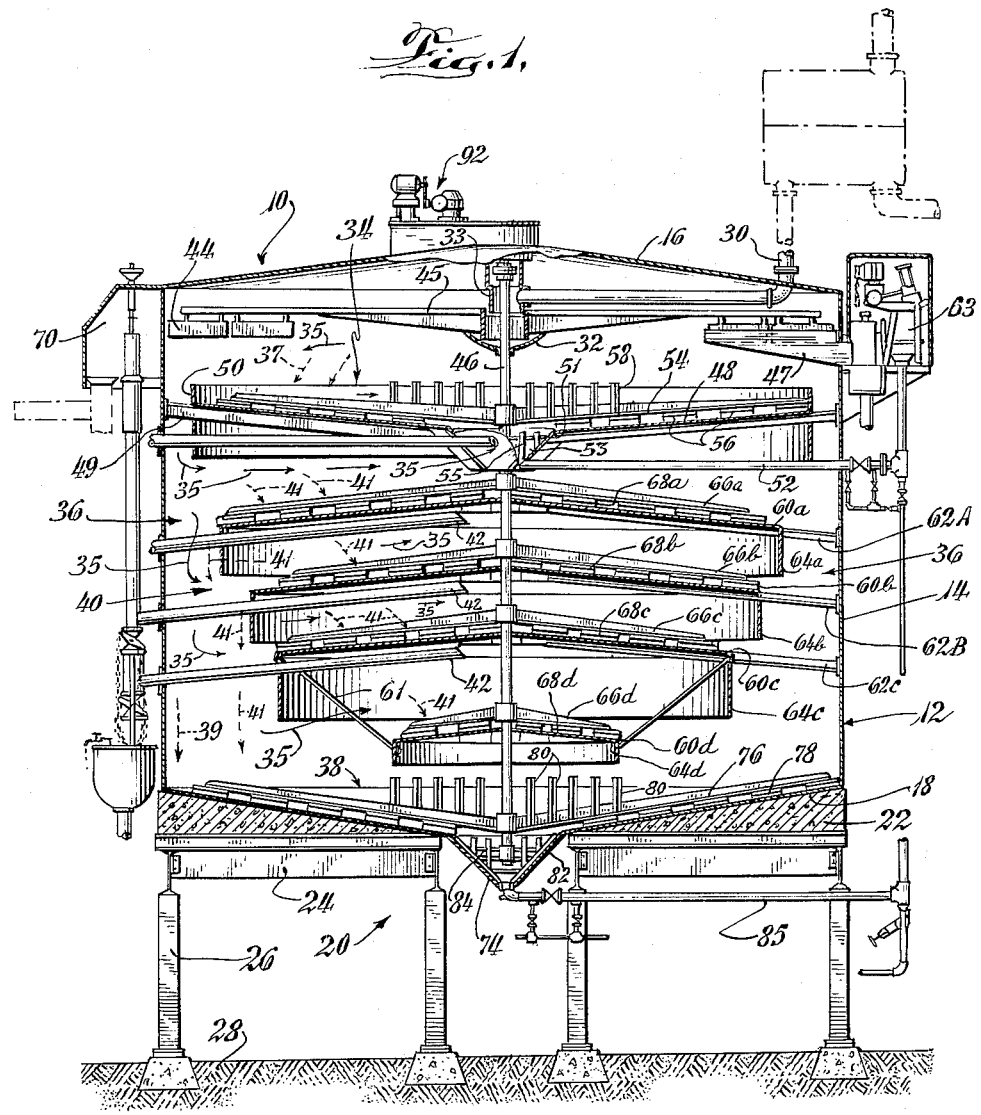
FIGURE 1 is a vertical cross-sectional view of a clarifier apparatus embodying the features of the present invention.
Figure 2:
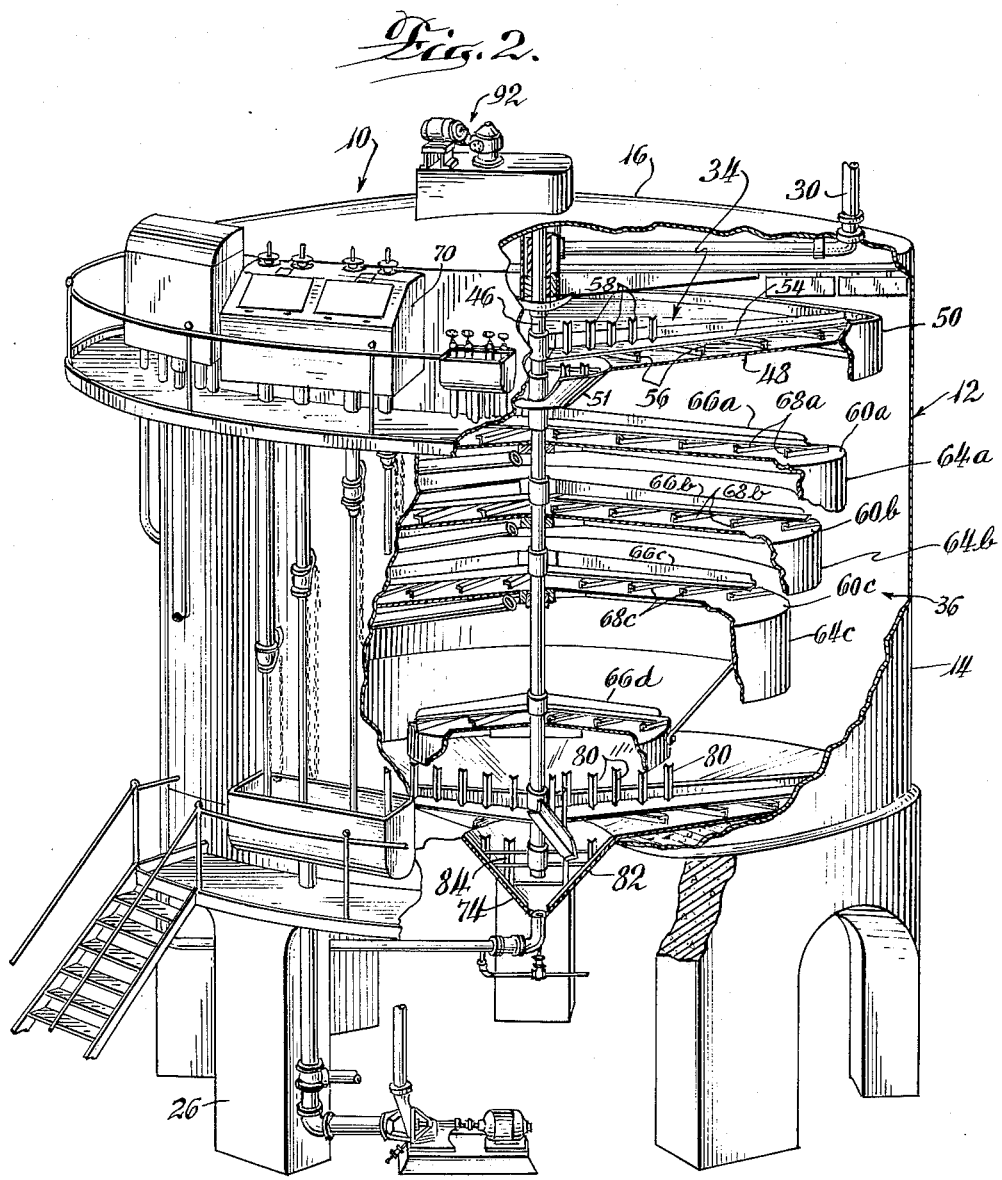
FIGURE 2 is a fragmentary perspective view of the clarifier apparatus of FIG. 1.

Referring now to the drawings, and particularly to FIGURES 1 and 2, there is illustrated a clarifier apparatus generally identified by reference numeral 10. The clarifier apparatus 10 functions to purify liquids containing solids or contaminants and has wide application in sugar processing. For example, in a preferred application of the clarifier apparatus a liquid mixture comprising juices from pulverized sugar cane, pulverized sugar cane itself, and other impurities such as solid contaminants and mud, are admitted into the clarifier apparatus 10. Both clarified liquid and, in addition, solids and particles are extracted from the clarifier apparatus.

More specifically, and as shown in FIG. 1, the clarifier apparatus comprises a vertically oriented tank 12 including a cylindircal body wall 14 interconnecting a conical top 16 and a conical bottom 18 suitably mounted on a supporting structure 20. The structure 20 comprises an annular wedged shaped block 22 which rests on a plurality of radially extending "I" beams 24. The "I" beams are suitably supported by vertically oriented columns 26 that rest on a floor 28 or the like.

The liquid to be treated enters the clarifying apparatus 10 through an inlet conduit 30 that conducts the liquid to the top and center of the apparatus 10. The inlet fluid is directed radially outward of the apparatus 10 by an inlet deflection plate 32 and passes over a primary sedimentation area 34. In this area 34 the heaviest solids or agglomerated particles are separated from the liquid and are immediately removed from the clarifier apparatus. The flow of inlet fluid is indicated by solid arrows 35 while the flow of heavy solids or particles is indicated by dotted arrows 37. Partially purified liquid flows to the wall 14 of the tank 12 and enters a free-fall separation zone generally identified by reference numeral 36. Substantially all the solids or particles in the partially purified liquid pass through the free-fall zone under gravity control and are collected in a secondary sedimentation area located at the bottom of the clarifier apparatus and generally identified by reference numeral 38. The flow of separated particles in the free-fall zone 36 is indicated by dotted lines 39. The liquid leaving the free-fall zone 36, the flow of which is indicated by solid arrows 35, passes into a final separation zone identified generally by reference numeral 40. In the zone 40, the smallest particles are removed from the liquid and are returned to the free-fall zone 36 to be collected in the secondary sedimentation area 38, the flow of solids into and through the final separation zone and, further, through the free-fall zone 36 as indicated by dotted arrows 41. The purified liquid, as shown by solid arrows 35, leaves the separation zone 40 and flows into outlet conduits 42 that have mouths located substantially along the center line of the clarifier apparatus 10.

Referring now in greater detail to the clarifier apparatus 10, the inlet deflection plate 32 is located beneath the liquid level in the clarifier apparatus 10 and is concaved upwardly to impart a gentle turbulence to the inlet liquid. Immediately upon entry into the apparatus the inlet liquid undergoes controlled flocculation and flows in a rolling motion radially outward of the tank 14. As a result of the flocculation, foam builds up on the surface of the liquid and is removed by foam skimmers 44 mounted on arms 45 which are suitably secured to a drive shaft 46, the drive shaft 46 being journalled in suitable structure supported from the top 16 and bottom 18 of the tank 12. The foam skimmers 44 direct the foam into a foam canal 47 from which the foam is withdrawn from the clarifier apparatus 10.

By the use of the foam skimmer arrangement, floating matter entrapped in the foam is continuously or intermittently withdrawn from the surface of the liquid in the apparatus 10 in a positive controlled manner. In many clarification operations such as sugar treatment, it is essential to minimize residence time within the vessel to avoid undesirable side effects such as putrefaction or inversion. The removal of undesirable floating contaminants by the foam skimmer accomplishes this.

Another result of the controlled flocculation is the formation of heavy agglomerated particles that immediately settle in the primary sedimentation area 34 which is located beneath the inlet deflection plate 32 and the foam scraper 44 and associated supporting arm 45. Hence, the heavy agglomerated particles formed by the controlled flocculation immediately settle out of solution and are collected in the sedimentation area 34.

More particularly, the primary sedimentation area 34 comprises a primary settling and collection tray 48 which is of substantially circular configuration and equally spaced beneath the skimmer 44 and supporting arm 45. As shown in FIGURE 1, the tray 48 is a downwardly convergent generally conical imperforate tray member and is supported from the wall 14 of the apparatus 10 by a plurality of spokes 49. Although the spokes 49 are in the path of the liquid flowing into the free-fall zone 36, their spaced relationship effectively avails interference with the liquid flow. Suitably attached to the periphery of the settling and collection tray 48 is an apron 50 that extends slightly above and substantially beneath the tray 48, as best shown in FIG. 2. The center or lowest portion of the tray 48 comprises a downwardly extending conical sump 51 which collects the particles falling on the tray 48 and, as shown, is apertured to accommodate the drive shaft 46. The particles that are collected in the sump 51 are pumped out of the sump 51 by suitable pumping equipment through a conduit 52 extending radially through the wall 14 of the apparatus 10.

In order to assure movement of the collected solids and contaminants toward the sump 51, radially extending scrapers 54 are fixedly attached to the rotatable drive shaft 46 so that sets of downwardly depending scraper blades 56 sweep or engage the upper surface of the tray 48. The blades 56 are spaced along the scrapers 54 in inclined relation so as to induce flow of the particles from the periphery of the tray 48 to the sump 51. For the purpose of liberating liquid entrapped in the accumulated particles and of thickening the particles before withdrawal from the sump 51, spaced apart thickening pickets 58 extend upwardly from the scraper 54. The thickening pickets 58 move with the scrapers 54 and pass through the collected particles or solids at a speed which frees entrapped liquid yet which does not project the particles back into the liquid.

The sump 51, similar to the settling and collection tray 48, includes sets of scrapers 53 which are drivingly connected to the drive shaft 46 to sweep the conical surface of the sump 51. In addition, thickening pickets 55, generally similar to thickening pickets 58, are vertically supported from the scrapers 53 and perform the function of freeing any entrapped liquid and, further, of preventing "set up" of the accumulated particles in the sump 51. Thus, the thickening pickets 55 continuously move the accumulated particles at a very slow rate and maintains the particles in a dynamic state to facilitate withdrawal of the accumulated particles from the sump 51.

By the use of the primary sedimentation area 34, the liquid entering the clarifier apparatus is immediately cleansed of a substantial amount of heavy agglomerated particles or solids, with the result that purification of the liquid in successive stages is more readily achieved.

The liquid that reaches the periphery of the primary sedimentation area 34 is partially purified and moves downwardly into the free-fall separation zone 36 defined vertically between the primary sedimentation area 34 and the secondary sedimentation area 38 and defined horizontally between the tank wall 14 and the final separation zone 40. The partially cleansed liquid passes downwardly between the tank wall 14 and the apron 50 of the settling tray 48 under the control of an outlet sump (not shown) located in a draw-off box 70. As described in greater detail below, those heavy agglomerated particles that do not settle on the settling tray 48 and medium weight particles that normally do not settle on the settling tray 48 pass downwardly under gravity through the free-fall zone 36 and are collected in the second sedimentation area 38, the path of particle movement being identified by dotted arrows 39 in FIG. 1. Thus, a substantially cleansed liquid containing only lightweight particles that normally do not settle out in the free-fall zone 36 flows into the final separation zone 40. The paths of liquid movement are radially inward and are identified by solid arrows 35 in FIG. 1.

The final separation zone 40 comprises a plurality of settling trays 60a, 60b, 60c, and 60d that are vertically spaced apart along the axis of the tank 14. Specifically, trays 60a, 60b, and 60c are supported from the tank wall 14 by sets of spokes 62a, 62b, and 62c, while the tray 60d, in contrast to trays 60a, 60b, and 60c, is suspended from and is located immediately beneath the tray 60c by suitable rods 61.

As best seen in FIG. 1, the trays 60a, 60b, 60c, and 60d are upwardly convergent generally conical imperforate tray members, in contrast with the upwardly concaved, above described settling tray 48. In further contrast to the tray 48, the settling trays 60a, 60b, 60c, and 60d have depending downwardly from their peripheries annular skirts 64a, 64b, 64c, and 64d, respectively. Each successively lower secondary tray 64 is of progressively smaller diameter, with the results that the surface areas of the successively lower trays 60b, 60c, and 60d are progressively smaller.

Inasmuch as the partially clarified liquid moves from the free-fall separation zone 36 to the outlet conduits 42 and, hence, passes over the settling trays 60a, 60b, 60c, and 60d, the lighter agglomerated particles settle out on the settling trays 60a, 60b, 60c, and 60d as the liquid moves radially inwardly of the tank wall 14. The paths of the settling particles are shown by dotted arrows 41 in FIG. 1. In order to prevent accumulation of particles on the trays 60a, 60b, 60c, and 60d, and, further, to direct the accumulated particles into the secondary sedimentation area 38, sets of scrapers 66a, 66b, 66c, and 66d are fixedly attached to the drive shaft 46 so as to be located above the respective settling trays 60a, 60b, 60c, and 60d. More particularly, the scrapers 66a, 66b, 66c and 66d are respectively provided with sets of scraper blades 68a, 68b, 68c, and 68d which are inclined so as to move accumulated particles radially outward across the trays 60a, 60b, 60c, and 60d into the free-fall separation zone 36. The paths of particle movement is indicated in FIG. 1 by dotted arrows 41 and, as clearly shown, the particles fall off the periphery of the respective settling trays 60a, 60b, 60c, and 60d and enter the free-fall separation zone 36 to be collected in the secondary sedimentation area 38.

Hence, as the liquid passes through the final separating zone 40; i.e. over the settling trays 60a, 60b, 60c, and 60d, substantially all of the particles suspended in the liquid settle out onto the trays 60a through 60d, with the result that the liquid at the center region of the trays 60a, 60b, 60c, and 60d is in purified form. Accordingly, the liquid that enters the outlet conduits 42 is purified or clarified and is suitable for further processing. In this connection, it should be appreciated that the outlet pump (not shown) located in the draw-off box 70 causes the above described flow of liquid through the clarifier apparatus 10 and, since the pump is of the variable speed type, the rate of flow of the liquid through the clarifier apparatus is readily adjustable to cause optimum sedimentation of the suspended particles in the liquid.

It will be appreciated that the free-fall separation zone 36 has a volume which provides for the fastest possible settling of particles in accordance with Hazen's theory of clarification. This theory of clarification states that the rate of particles settling is inversely proportional to the amount of particle concentration in a given cross-sectional volume. Since large concentrations of particles cause interference with the settling rates of individual particles, a high concentration of particles per unit volume will settle slower than a low concentration of the same particles for the same unit volume. Thus, since the separating trays 60a, 60b, 60c, and 60d are arranged to provide an inwardly and downwardly stepped construction, the free-fall volume in the free-fall separation zone 36 increases and, accordingly, the particle concentration decreases as the particles progress downwardly in the tank 14. Hence, the rate of settling of the particles in the free-fall zone 36 is not retarded by the continuous entry into the free-fall zone 36 of additional particles from the settling tray 48 or the settling trays 60a, 60b, 60c, and 60d because of the downwardly expanding volume provided in the free-fall separating zone 36.

In addition, it will be appreciated that the rate of settling of particles in the free-fall separation zone 36 is greatly increased because of the immediate settling out of heavy agglomerated particles on the settling tray 48 in the primary sedimentation area 34. Furthermore, the rate of settling of the lightweight particles on the separation trays 60a, 60b, 60c, and 60d is similarly increased because of the absence of the heavy agglomerated particles. In this connection, it is appropriate to note that a large percentage of the particles remaining in the liquid passing into the free-fall separation zone 36 settles out directly in the secondary sedimentation area 38 and does not pass into the final separating zone 40. Actually, only the lightweight particles pass into the final separation zone 40 and it is these small particles that settle out on the final separating trays 60a, 60b, 60c, and 60d and are moved to the periphery of the trays for collection in the secondary sedimentation area 38.

Considering now the secondary sedimentation area 38 in greater detail, it includes a settlement tray which constitutes the bottom 18 of the tank 12. The bottom or collecting tray 18, similar to the collecting tray 48, is concaved upwardly so that the collected particles can be easily directed towards a generally conical sump 74 located centrally of the bottom 18. Similar to the primary sedimentation area 34, scrapers 76 are suitably attached to the drive shaft 46 and include downwardly depending scraper blade sets 78. Similar to the above described scraper blades 56, sets of scraper blades 78 are so arranged on the scrapers 76 that they sweep the bottom 18 and move the particles radially inward into the sump 74. The scrapers 76, similar to the scrapers 54, include upwardly extending, spaced apart thickening pickets 80 which perform the same function as the above described thickening pickets 58; i.e. the thickening pickets 80 define paths through which entrapped liquid is liberated and, further, thicken the accumulated particles.

Positioned within the sump 74 are a set of sump scrapers 82 which are constructed generally similar to the above described sump scrapers 53. More specifically, the sump scrapers 82 are fixedly attached to the drive shaft 46 and sweep the upper surface of the sump 74. The function of the sump scrapers 82 is to prevent the "setting up" of the particles with attendant adhesion to the walls of the sump 74. Similar to the above described sump 51, a set of vertically extending thickening pickets 84 is attached to the scraper 82. The function of the thickening pickets 84, of course, is to keep the particles constantly moving at a very slow rate since some materials which comprise parts of the particles have a very low viscosity when present in a sedimentation form or the like. Hence, these materials would harden into a somewhat sticky solid if movement of the particles was not provided. In this connection, it should be appreciated that the thickening pickets 80 and 84 are rotated at a speed that gently agitates the particles, yet does not cause them to re-enter the fluid. In any event, the thickened particles pass out of the sump 74 through an outlet conduit 85 to an accumulation area under the control of the outlet pump 63.

A variable speed drive mechanism 92 is drivingly connected to the drive shaft 46 so that the speed of the drive shaft 46 and its attached components can be accurately controlled. Since the foam scrapers 44, the scrapers 54 and associated thickening pickets 58, the sump scrapers 53 and associated thickening pickets 55, the scrapers 66a, 66b, 66c, and 66d, the scrapers 76 and associated thickening pickets 80, and the sump scrapers 82 and associated thickening pickets 84 are fixedly secured to the drive shaft 46, the shaft 46 is rotated at a speed such that each of the above components performs its intended function, without stirring up or agitating the particles that have settled out on the trays 48, 60a, 60b, 60c, 60d, and 18.

Assuming that the clarifier apparatus is used for its preferred purpose to process sugar, a liquid or mixture comprising sugar cane juice, crushed pulverized sugar cane per se, and mud and the like, is delivered to the clarifier apparatus 10 through the inlet pipe 30. The liquid enters the top central portion of the clarifier apparatus 10 through an opening 33 located concentrically about the drive shaft 46. The liquid impinges upon the inlet deflection plate 32, which is located beneath the liquid level in the apparatus 10 and a very gentle turbulence is imparted to the liquid to promote self flocculation in the area adjacent the deflection plate 32. As a result of controlled flocculation, a heavy foam is produced for the purpose of entrapping floating matter and the like. As is well known in clarification operations of sugar, prompt removal of undesirable floating contaminants is desired to prevent inversion; i.e. prevent the sucrose (cheap, sweet sugar) from inverting to other forms of sugar that are as sweet as sucrose. To this end, the foam, containing undesirable floating contaminants, is directed into the foam canal 47 under the control of the foam scrapers 44.

A second result of the self-flocculation is the production of heavy agglomerated particles which settle out of the primary settling and collecting tray 48. The agglomerated particles are moved radially inwardly into the sump 51 under the control of the scraper blades 56. The thickening pickets 58 and the sump pickets 55 do not agitate the collected particles to cause them to re-enter the liquid but merely provide paths through which entrapped liquid may escape. In addition, the pickets prevent the hardening of the collected particles in both the central area of the settling tray 48 and in the sump 51. Hence, it will be appreciated that the collected particles, as they move toward the center of the settling tray 48, become thicker yet and are maintained in a viscous condition to permit the collected particles to be moved into the sump 51 and to be withdrawn through the outlet pipe 52 under the control of the pump 63.

It has been determined that the location of the primary sedimentation area 34 immediately adjacent to the inlet conduit 30 causes the removal of approximately 60% of the particles from the incoming liquid. Accordingly, only about 40% of the remaining particles need be removed from the liquid during the remaining operations in the clarifier apparatus 10. As suggested above, the removal of the heavy agglomerated particles in the primary sedimentation area 34 greatly increases the rate of settling of the balance of the particles remaining in the liquid—since the concentration of particles in a given volume in the free-fall separation zone 36 is considerably less when the primary sedimentation area is used than when it is not.

The partially cleansed or purified liquid; i.e. the liquid from which the heavy agglomerated particles have been removed, passes radially over the tray 48 and moves downwardly into the free-fall separation zone 36. When in this zone 36, a large percentage of the particles suspended in the liquid settle out in the free-fall separation zone 36 and fall directly to the bottom of the tank, as indicated by dotted arrows 39, into the secondary sedimentation area 38. The almost completely cleansed liquid leaves the free-fall separation zone 36 in a radial direction and passes into the final separation zone 40. Specifically, the liquid follows paths indicated by solid arrows 35; i.e. between the trays 48 and 66a, or the trays 66a and 66b, or the trays 66b and 66c, or the tray 66c and the tray 66d.

The liquid that passes between the trays includes finely suspended particles which settle out on the settling trays 60a, 60b, 60cc, and 60d as the liquid passes radially inwardly of the apparatus 10. At the innermost point of the trays 60a, 60b, 60c, and 60d the liquid is highly purified or clarified and enters the mouths of the outlet conduits 42 in this state to be pumped to a proper accumulation area.

The particles that settle on the trays 60a, 60b, 60c, and 60d are moved back into the free-fall separation zone 36 under the control of the scraper blades 68a, 68b, 68c, and 68d. Since the trays 60a, 60b, 60c, and 60d form a stepped construction, the particles quickly settle into the secondary sedimentation area 38—without interfering with the passage of liquid between successively lower pairs of trays. It would thus be appreciated that all of those particles that do not settle out on the upper settling tray 48 settle either directly or indirectly through the settling trays 60a, 60b, 60c, and 60d in the secondary sedimentation area 38. The particles collected on the bottom 18 are moved radially inwardly under the control of the scraper blades 78 and the scrapers 82 into the sump 74. The thickening pickets 80 and the thickening pickets 84 function to thicken the particles and, additionally, to liberate any liquid that may be trapped by the particles. By this arrangement, there is insured a steady flow of particles to the bottom of the sump 74 from which the thickened particles are withdrawn through the outlet conduit 85 to a suitable accumulation area.

While an embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A clarifier apparatus comprising: a tank, a plurality of superimposed spaced apart tray members mounted within said tank, said trays being spaced from said tank and defining therewith an outer annular peripheral free-fall zone, the uppermost of said tray members being a downwardly convergent generally conical imperforate tray member having a centrally located downwardly depending imperforate receptacle for collecting easily settled particles for removal from said tank, means for introducing a liquid to be clarified into said tank generally centrally above said uppermost tray member, said liquid containing easily settled particles and less easily settled particles, said less easily settled particles passing with said liquid over the periphery of said uppermost tray into said free-fall zone, said tray other than said uppermost tray member being upwardly convergent generally conical imperforate tray members, means fluidly communicating with said receptacle for withdrawing from said tank settled particles in said receptacle so that said settled particles do not reach the bottom of said tank.

2. A clarifier apparatus comprising: a tank, a plurality of vertically superimposed spaced apart tray members mounted in said tank, said trays being spaced from said tank and defining therewith an outer annular peripheral free-fall zone, the uppermost of said tray members being a downwardly convergent generally conical imperforate tray member having a centrally located downwardly depending imperforate receptacle for collecting easily settled particles for removal from said tank, means for introducing a liquid to be clarified into said tank generally centrally above said uppermost tray member, said liquid containing easily settled particles and less easily settled particles, said less easily settled particles passing with said liquid over the periphery of said uppermost tray into said free-fall zone, said tray members other than said uppermost tray member being upwardly convergent generally conical imperforate tray members, a sweep means mounted above said uppermost tray member for moving said easily settled particles settled on said uppermost tray member toward said receptacle, sweep means mounted above each of said other tray members for moving less easily settled particles settled on said other tray members towards said free-fall zone, means for withdrawing from said tank settled particles in the bottom of said tank, and means fluidly communicating with said receptacle for withdrawing from said tank settled particles in said receptacle so that said settled particles do not reach the bottom of said tank.

3. A clarifier apparatus comprising: a tank, a plurality of vertically superimposed spaced apart tray members mounted in said tank, said trays being spaced from said tank and defining therewith an outer annular peripheral free-fall zone, said tray members decreasing in surface area progressively from the top of said tank, the uppermost of said tray members being a downwardly convergent generally conical imperforate tray member having a centrally located downward depending imperforate receptacle for collecting easily settled particles for removal from said tank, means for introducing a liquid to be clarified into said tank generally centrally above said uppermost tray member, said liquid containing easily settled particles and less easily settled particles, said less easily settled particles passing with said liquid over the periphery of said uppermost tray into said free-fall zone, said tray members other than said uppermost tray member being upwardly convergent generally conical imperforate tray members, a sweep means mounted above said uppermost tray member for moving easily settled particles settled on said uppermost tray member toward said receptacle, sweep means mounted above each of said other tray members for moving less easily settled particles settled on said other tray members towards said free-fall zone, means for withdrawing from said tank settled particles in the bottom of said tank, and means fluidly communicating with said receptacle for withdrawing from said tank settled particles in said receptacle so that said settled particles do not reach the bottom of said tank.

4. In a multi-tray clarifier apparatus: a tank, a plurality of vertically superimposed spaced apart tray members mounted in said tank, said trays being spaced from said tank and defining therewith an outer annular peripheral free-fall zone, said tray members progressively defining smaller surface areas from the top of said tank, the uppermost of said tray members being a downwardly convergent generally conical imperforate tray member and having a centrally located downwardly depending receptacle for collecting easily settled particles for removal from said tank, said tray members other than said uppermost tray member being upwardly convergent generally conical imperforate tray members, means for introducing liquids to be clarified into said tank generally centrally above said uppermost tray member, said liquid containing easily settled particles and less easily settled particles, said less easily settled particles passing with said liquid over the periphery of said uppermost tray into said free-fall zone, an inner clarifying zone below each of said tray members, means for withdrawing clarified liquid from said clarifying zones, sweep means mounted above said uppermost tray member for moving easily settled particles settled on said uppermost tray member into said receptacle, sweep means mounted above each of said other tray members for moving less easily settled particles settled on said other tray members toward said free-fall zone, means for withdrawing from said tank settled particles in the bottom of said tank, and means fluidly communicating with said receptacle for withdrawing from said tank settled particles in said receptacle so that said settled particles do not reach the bottom of said tank.

5. In a multi-tray clarifier apparatus as in claim 4 including a foam skimmer mounted above said uppermost tray member, a foam canal operatively positioned with respect to said foam skimmer whereby accumulated foam may be deposited into said foam canal, means for withdrawing foam from said foam canal.

6. In a multi-tray clarifier apparatus as in claim 4 including thickening pickets integrally formed on said sweep mounted above said uppermost tray member adjacent said receptacle for thickening the settled particles flowing into said receptacle in said uppermost tray member.

7. In the multi-tray clarifier apparatus of claim 4 including a bottom receptacle positioned in the bottom of said tank, a bottom sweep positioned above the bottom of said tank for moving particles settled on the bottom of said tank towards said bottom receptacle.

8. In a multi-tray clarifier apparatus as in claim 7 including thickening pickets integrally formed on said bottom sweep adjacent said bottom receptacle for thickening settled particles flowing into said bottom receptacle.

References Cited by the Examiner
UNITED STATES PATENTS

| | | |
|---|---|---|
| 456,852 | 7/1891 | Rodermond. |
| 1,135,997 | 4/1915 | Dorr _____ 210—521 |
| 1,237,745 | 8/1917 | Bloomfield _____ 210—522 |
| 1,274,814 | 8/1917 | Dundness et al. _____ 210—522 |
| 1,392,213 | 9/1921 | Peck. |
| 1,402,079 | 1/1922 | McHugh _____ 210—73 X |
| 1,794,374 | 3/1931 | Graham et al. _____ 210—522 |
| 1,960,904 | 5/1934 | Gilchrist _____ 210—522 |
| 2,003,357 | 6/1935 | Gilchrist _____ 210—522 |
| 2,081,632 | 5/1937 | McBain _____ 210—521 |
| 2,103,796 | 12/1937 | Graham et al. ____ 210—522 X |
| 2,103,828 | 12/1937 | Seip _____ 210—83 |
| 2,153,607 | 4/1939 | Bach _____ 210—522 |
| 2,195,739 | 4/1940 | Rolston _____ 210—83 |
| 2,207,399 | 7/1940 | Gaertner _____ 210—73 |
| 2,233,641 | 3/1941 | Ramsey _____ 210—194 |
| 2,236,202 | 3/1941 | Villauso _____ 210—522 |
| 2,253,543 | 8/1941 | Weber et al. _____ 210—525 X |
| 2,267,516 | 12/1941 | Adams _____ 210—73 |
| 2,340,132 | 1/1944 | McHugh et al. _____ 210—73 |
| 2,343,836 | 3/1944 | Weber _____ 210—73 |
| 2,352,772 | 7/1944 | Darby _____ 210—208 |
| 2,355,875 | 8/1944 | Lasseter _____ 210—73 |
| 2,377,875 | 6/1945 | Geissler _____ 210—525 X |
| 2,624,463 | 1/1953 | Freese _____ 210—519 |
| 2,850,449 | 9/1958 | Torpey _____ 210—83 |
| 2,889,927 | 6/1959 | Van Note _____ 210—522 X |
| 3,036,713 | 5/1962 | Lambeth. |

REUBEN FRIEDMAN, *Primary Examiner.*

ROBERT F. BURNETT, HERBERT L. MARTIN, CHARLES SUKALO, *Examiners.*